March 12, 1968

R. J. MEIJER 3,372,735

ROTARY HEAT-EXCHANGERS AND HOT-GAS ENGINES

Filed March 7, 1966

INVENTOR.
ROELF MEIJER
BY

AGENT

March 12, 1968  R. J. MEIJER  3,372,735
ROTARY HEAT-EXCHANGERS AND HOT-GAS ENGINES
Filed March 7, 1966  4 Sheets-Sheet 3
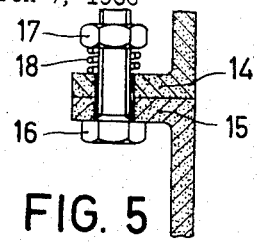
FIG. 5
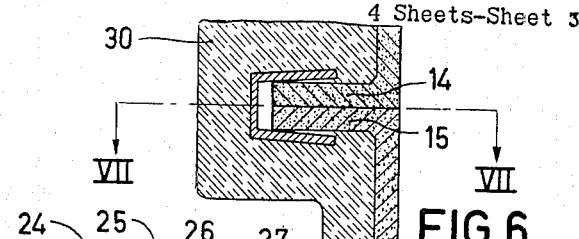
FIG. 6
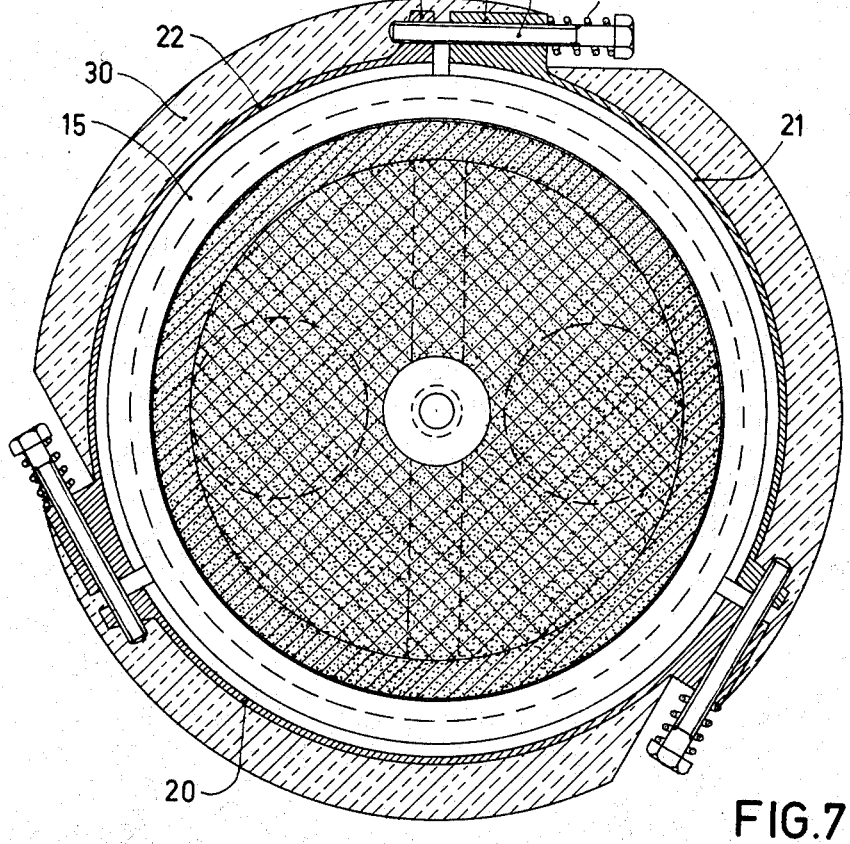
FIG. 7
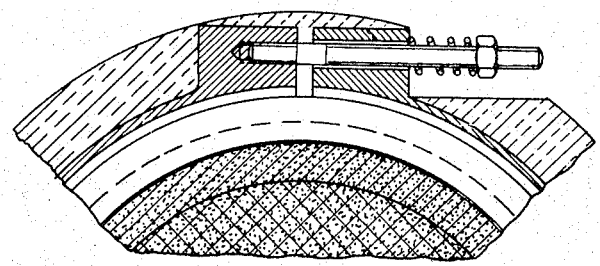
FIG. 7ᵃ
INVENTOR.
ROELF MEIJER
BY
Frank R. Trifari
AGENT March 12, 1968     R. J. MEIJER     3,372,735
ROTARY HEAT-EXCHANGERS AND HOT-GAS ENGINES
Filed March 7, 1966     4 Sheets-Sheet 4

INVENTOR.
ROELF MEIJER
BY
Frank R Trifari
AGENT

United States Patent Office 3,372,735
Patented Mar. 12, 1968

3,372,735
ROTARY HEAT-EXCHANGERS AND HOT-GAS ENGINES
Roelf Jan Meijer, Emmasingel, Eindhoven, Netherlands, assignor to North American Philips Company, Inc., New York, N.Y., a corporation of Delaware
Filed Mar. 7, 1966, Ser. No. 532,279
Claims priority, application Netherlands, Mar. 11, 1965, 65—3,087
6 Claims. (Cl. 165—9)

This invention relates to rotary heat-exchangers containing a filling mass of a glass-ceramic material of low coefficient of expansion which can rotate within a housing and allows the passage of gas. The housing is provided with inlet and outlet apertures for the heat-exchanging media, seals for preventing leakage of medium along the filling mass being provided between the filling mass and the housing.

In known heat-exchangers of the kind to which the present invention relates, the seal between the housing and the filling mass rotating in it always constitutes an important problem since the housing and the filling mass exhibit great differences in expansion. In known heat-exchangers the seals are usually formed by sealing members connected to the housing or the filling mass, the sealing faces moving along one another with friction. This results in wear, especially in the range of higher temperatures. Further much energy is required to overcome the friction. Another disadvantage of such moving seals is their comparatively complicated construction.

An object of the invention is to solve the above-mentioned problem of sealing and the invention underlies recognition of the fact that it is possible to use gap seals instead of moving seals if the gaps to be sealed have a constant width during operation.

In order to put the above-mentioned recognition into practice, a heat-exchanger according to the invention is characterized in that the housing is also made from a glass-ceramic material having a coefficient of expansion which is equal, at least substantially, to that of the filling mass, the relevant seals being formed by gap seals.

In connection with the present application the term "glass-ceramic material" has to be understood to mean a material obtained from vitreous material by means of a thermal treatment which causes a finely-dispersed separation of a crystalline phase, resulting at last in material composed of finely-dispersed crystalline material surrounded by a vitreous phase.

Because of its high resistivity to temperature and temperature jumps, this known material is highly suitable for use as the filling mass in heat-exchangers. Further this glass-ceramic material may have a very low coefficient of expansion which may be of the order of 10× lower than that of stainless steel. This affords the possibility to make the gaps between the filling mass and the housing very narrow. Owing to the low coefficient of expansion, the width of the gap will hardly change during operation, even when subjected to the very high temperature. These narrow gaps may thus serve themselves for sealing. The advantage of these seals are their simple construction and the absence of friction and wear.

In a heat-exchanger according to the invention the seals counteracting leakage in the axial direction and also, the seals counteracting leakage in the tangential direction, and hence from the channel for one medium to the channel for the other medium, are formed by gap seals.

A heat-exchanger according to the invention affords the further advantage that the housing is also made from highly-resistant material similar to the filling mass. Owing to the low coefficient of expansion of the material used for the filling mass and the housing it has become possible to make the gap seal so narrow as to be comparable with the channels in the filling mass with regard to its heat-regenerating properties.

In order to realize this in practice, another embodiment of the heat-exchanger according to the invention containing a filling mass having relatively parallel channels, is characterized in that the gap seals have a width of gap, at most equal to half the hydraulic diameter of the channels in the filling mass.

Another advantageous embodiment of the heat-exchanger according to the invention is characterized in that a central shaft is arranged in the filling mass which shaft is made from a glass-ceramic material having a coefficient of expansion substantially equal to that of the material of the filling mass.

Due to the absence of moving seals the forces required for rotating the filling mass have become so small that the filling mass can be rotated by means of a central shaft.

In another advantageous embodiment the housing comprises two parts, the plane of separation being at right angles to the centre line, each part having one inlet aperture and one outlet aperture for medium, which apertures are formed substantially in diametrical opposition on each side of the centre line, each part also having a sealing edge located between the said two apertures. A rotary heat-exchanger is thus obtained which is very simple in structural respect.

Another advantageous embodiment of the heat-exchanger according to the invention is characterized in that the two parts of the housing have flanges at the plane of separation which are urged against each other by the use of pre-stressed springs. The pre-stressed springs ensure that the parts of the housing keep tightly pushed against each other despite the differences between the coefficients of expansion of the material of the housing and the material of the housing and the material of the junction means.

According to the invention the flanges may be urged against each other by surrounding their outer periphery by an annular band of U-shaped cross-section consisting of one divided part or a plurality of parts, the limbs of the band which embrace the flanges having a conical shape, and at the area of the division or of each separation between two parts of the annulus one of the co-acting ends of the ring either having a structural part with internal screwthread which accommodates a tangentially extending threaded bolt or having a tangentially extending, bolt-shaped structural part, this threaded bolt or bolt-shaped structural part being surrounded by a spring which is enclosed between the head of the threaded bolt or between a nut co-acting with the bolt-shaped structural part and a collar on the other of the co-acting ends of the ring.

In another embodiment of a heat-exchanger according to the invention the housing of which is surrounded by thermal insulation, the structural part with internal screwthread or the bolt-shaped structural element, the threaded bolt or the nut and the collar are so shaped that the spring lies outside the insulation. The spring is thus not subjected to the high operating temperature of the heat-exchanger and thus completely retains its pre-tension even after a comparatively long period of operation.

The invention also relates to a hot-gas engine having one or more cylinders and one or more pre-heaters in which the hot combustion gases may be brought into heat-exchange with the combustion air. This hot-gas engine is characterized in that each pre-heater is constituted by one or more rotary heat-exchangers according to the invention, two associated medium inlet and outlet apertures of the heat-exchangers being included in the line system for the supply of combustion air and the two other associated apertures being included in the line system for the outlet of combustion gases. Because of its high resistivity to temperature and temperature jumps, a heat-exchanger according to the invention can well sustain the high temperatures occurring in the burner of a hot-gas engine and which are of the order of magnitude of 700° C. to 900° C. It can also satisfactorily sustain the rapid variations in temperature which occur during changing operating conditions (starting, stopping). Another advantage of the use of this kind of a heat-exchanger is that the leakage through the gap seals will be a minimum due to the small difference between the pressures of the heat-exchanging media.

Since a great couple is required to overcome the usually great frictional forces resulting from the moving seals, known heat-exchangers of the rotary type are usually driven at their periphery, for example, by means of a toothed rim-gear wheel transmission. These frictions do not occur in a heat-exchanger according to the invention so that it is now possible to provide the filling mass with a shaft which may be driven. This may be effected by coupling this shaft to a shaft of the engine. However, it is then necessary to use a mechanical transmission which involves a comparatively great loss. Another difficulty is that the filling mass rotates only if the engine is operating. Consequently the heat-exchanger will not rotate when the burner is heated-up for starting the engine so that a certain amount of heat is lost and the heat-exchanger will rapidly be contaminated with soot.

In another advantageous embodiment of a hot-gas engine according to the invention the shaft of the filling mass is coupled to an electric motor. The rotation of the filling mass is thus quite independent of the speed of rotation of the engine. A small electric motor already suffices owing to the small forces required for rotating the filling mass.

Another advantageous embodiment of a hot-gas engine according to the invention which includes a burner ventilator for the inlet and outlet, respectively, of combustion gases is characterized in that the engine includes a regulating device which simultaneously switches-on the devices for driving the burner ventilator and the heat-exchanger. Excessive de-position of soot such as may occur, for example, upon starting is thus prevented.

In multicylinder hot-gas engines a rotary heat-exchanger may be provided for each cylinder. In another advantageous embodiment, however, only one heat-exchanger is provided for all of the cylinders which is included in the line system for the inlet of combustion air and the outlet of combustion gases to the burners associated with the relevant cylinders.

In order that the invention may be readily carried into effect, it will now be described in detail, by way of example, with reference to the accompanying diagrammatic drawings, in which:

FIGURES 5, 6, 7 and 7a show several examples for securing the two halves of the housing of the heat-exchanger of FIGURES 1, 2 and 3;

Figure 1:
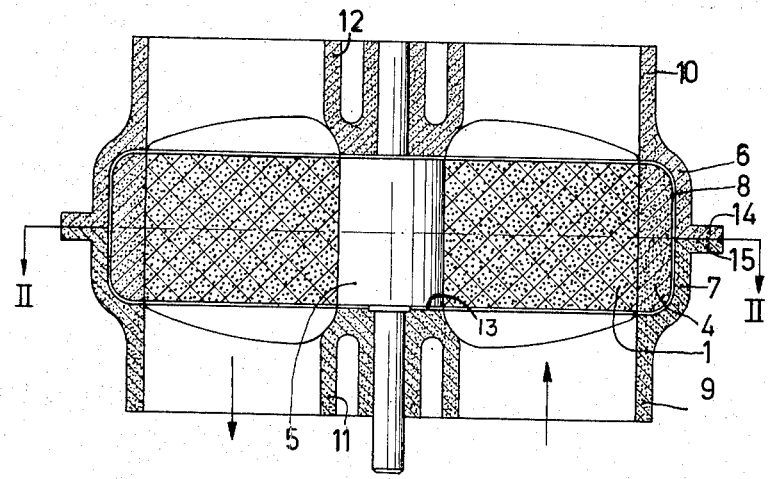
FIGURES 1, 2 and 3 show rotary heat-exchangers in two relatively perpendicular sections and in elevational view, respectively.
Figure 2:
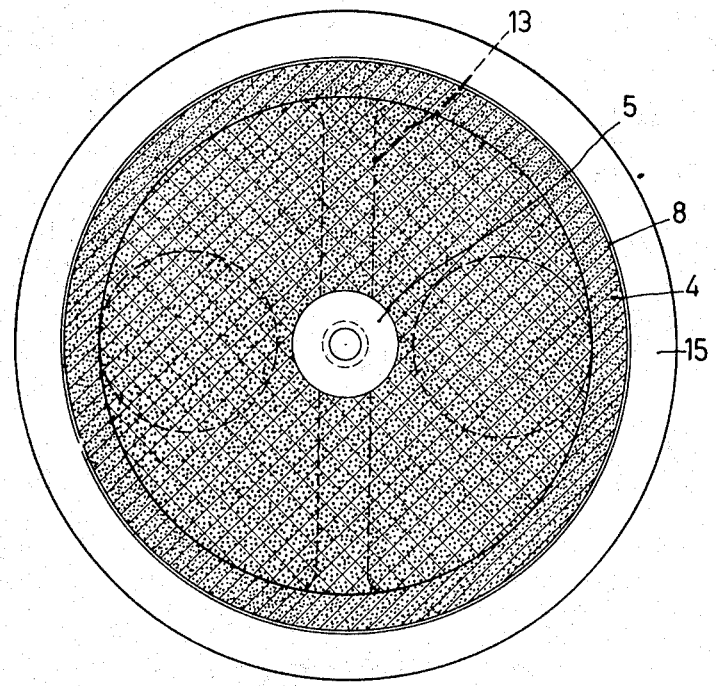
Figure 3:
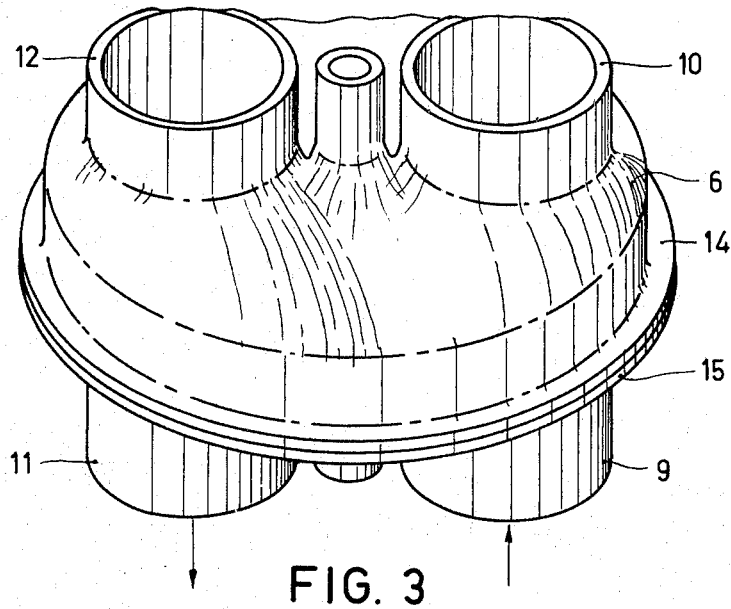
Figure 4:
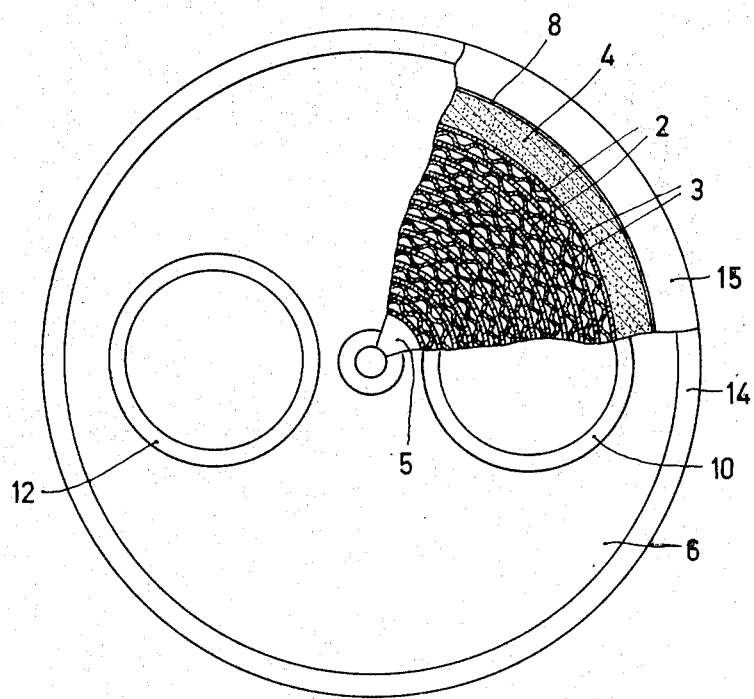
FIGURE 4 shows, not to scale, part of the filling mass.

FIGURES 1, 2 and 3 are two relatively perpendicular sectional views and an elevational view, respectively, of a rotary heat-exchanger in which a filling mass, designated 1 consists of a glass-ceramic material having a low coefficient of expansion. Part of this filling mass is shown in FIGURE 4, from which it may be seen that the filling mass is built up from a plurality of corrugated layers 2 and flat layers 3 which are wound around one another, thus obtaining parallel channels of flow for the heat-exchanging media. The filling mass is bounded externally by a gas-tight ring 4 of a material similar to the filling mass 1. A shaft 5 is centrally arranged in the filling mass 1 and likewise made from a glass-ceramic material. The filling mass is surrounded by a housing comprising two parts 6 and 7 which are also manufactured from a glass-ceramic material having a low coefficient of expansion. The seal between the outer periphery of the sealing mass and the housing is formed by a narrow gap 8. Due to the low coefficients of expansion of the material of the housing and of the filling mass, the gap 8 may be so narrow that leakage does not substantially occur any more. The housing has apertures 9 and 10 through which one medium can flow through the heat-exchanger and apertures 11 and 12 through which the other medium can pass.

In order to prevent leakage from one half of the heat-exchanger to the other, each part of the housing is provided with a sealing edge 13 which adjoins the filling mass very tightly so that in this case also a gap seal suffices. Any passage of medium from one half of the heat-exchanger to the other is thus suppressed. The parts 6 and 7 of the housing are provided with flanges 14 and 15 which must be urged against each other in a sealing manner.

To this end, the flanges have bores each provided with a bolt 16 and a nut 17 as shown in FIGURE 5. When the nut has been tightened in the cold state, the stress will have substantially disappeared in the operating condition (hot) due to the difference in expansion between the flanges and the bolt. To prevent this, a pre-stressed spring 18 is provided between the nut 17 and the flange. In the operating condition the spring 18 will invariably press the flanges together with sufficient force despite the expansion of the bolt 16. Another possible construction for joining the two parts of the housing is shown in FIGURES 6 and 7. In these figures the flanges 14 and 15 are surrrounded by three parts 20, 21 and 22 of a ring. FIGURE 6 shows that the parts of the ring have a U-shaped cross-section, the limbs which contact the flanges having a slightly conical shape so that the flanges are urged against each other when the parts of the ring are pushed inwards. At their adjacent ends, the ring parts have a portion 24 with internal screwthread and a perforated portion 25. A threaded bolt 26 may be screwed through the bore into the portion 24. A spring 27 is provided between the portion 25 and the head of the threaded bolt. This spring 27 is stretched upon tightening the threaded bolt so that the parts of the ring are pushed inwards. This construction affords the advantage that the spring 27 lies externally of an insulation 30 which will usually surround the heat-exchanger. Instead of shaping the portion 24 into the form of a nut, it is possible to form it as a bolt as shown in FIGURE 7a. This construction affords the advantage that the loaded screwthread now also lies outside the insulation, which is beneficial to its length of life. This means that the spring 27 will have substantially the ambient temperature, resulting in a longer life and retainment of its spring force.

Figure 8:
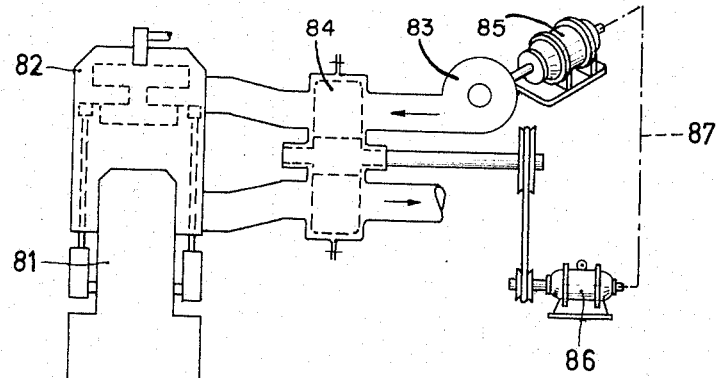
FIGURES 8, 9 and 10 show two embodiments of a hot-gas engine having a rotary preheater.

FIGURE 8 shows diagrammatically a hot-gas engine in which the refrence numral 81 indicates the engine, the construction and operation of which is assumed to be known. The head of the cylinder is surrounded by a burner space 82 to which combustion air must be supplied and from which combustion gases must be removed. Combustion air is supplied by means of a ventilator 83 which draws in air and supplies it to the burner space 82 through a heat-exchanger 84 which is identical in construction with that described with reference to the previous figure. The combustion gases leave the burner space 82 again through the heat-exchanger 84. The ventilator is driven by means of an electric motor 85 and the heat-exchanger is driven by means of an electric motor 86. The engine includes a regulating device 87 which ensures that the electric motors 85 and 86 are invariably switched on simultaneously.

Figure 9:
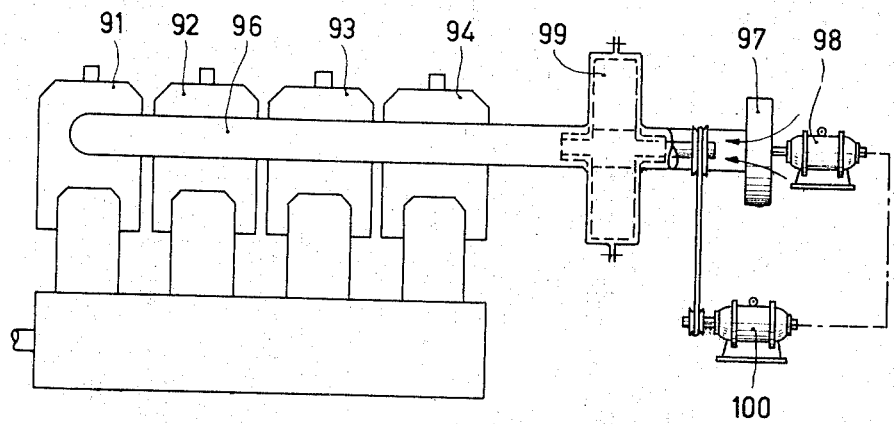
Figure 10:
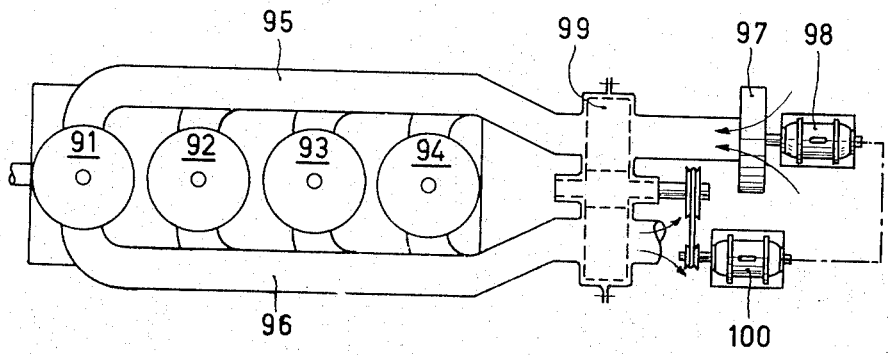

FIGURES 9 and 10 show a four-cylinder hot-gas engine. All four burner spaces 91, 92, 93 and 94 are connected to one line 95 for the supply of combustion air and to one line 96 for the removal of the combustion gases. A ventilator 97 driven by an electric motor 98 supplies the air through a heat-exchanger 99 to the line 95. The exhaust combustion gases leave the engine through the line 96 and also via the heat-exchanger 99.

An electric motor 100 provides for the rotation of the filling mass. This embodiment also includes a regulating device which ensures that both electric motors 98 and 100 are invariably switched on simultaneously.

What is claimed is:

1. A rotary regenerator comprising a rotor having a glass ceramic material of a low coefficient of expansion adapted for the passage of gas therethrough, said ceramic rotor being provided with inlet and outlet passages for the heat exchanging media, a housing spaced from said ceramic rotor and constituted of a glass ceramic material having a coefficient of expansion which is substantially equal to the coefficient of expansion of said ceramic rotor and a seal between said housing and said ceramic rotor being a gap seal.

2. A rotary regenerator as claimed in claim 1 wherein said ceramic rotor has channels extending substantially in parallel, and the gap seal has a gap width which is at most equal to half the hydraulic diameter of the channels in said ceramic rotor.

3. A rotary regenerator as claimed in claim 1 further comprising a central shaft in said ceramic rotor being constituted of a glass ceramic material having a coefficient of expansion which is substantially equal to that of said ceramic rotor.

4. A rotary regenerator as claimed in claim 1 wherein the housing comprises two parts, the plane of separation being substantially at right angles to the longitudinal axis of said heat exchanger, each part having two apertures for the inlet and the outlet respectively of the medium which are located diametrically opposite to each other on each side of said longitudinal axis of the heat exchanger, and each part being provided with a sealing edge positioned between said two apertures.

5. A rotary regenerator as claimed in claim 4 wherein the two parts of said housing have flanges at the plane of separation, and prestressed springs for urging said flanges into engagement with each other.

6. A rotary regenerator as claimed in claim 4 further comprising an annular segmented band of U-shaped cross section, the legs of which diverge outwardly and which engage the two parts of said housing, an end of said annular band being provided with a structural element having internal screw threads, a threaded bolt having a surrounding spring screw-connected in said structural element, and a screw-threaded aperture in the adjacent segment of the annular band, said threaded bolt being screw-connected from said structural element to said aperture to attach the adjacent segments of the annular band together.

References Cited
UNITED STATES PATENTS

| | | | |
|---|---|---|---|
| 2,469,758 | 5/1949 | Alcock | 165—9 |
| 2,852,233 | 9/1958 | Hryniszak | 165—9 |
| 3,101,778 | 8/1963 | Hazzard et al. | 165—10 |

ROBERT A. O'LEARY, *Primary Examiner.*

A. W. DAVIS, JR., *Assistant Examiner.*